United States Patent [19]

Joó et al.

[11] Patent Number: 4,543,635
[45] Date of Patent: Sep. 24, 1985

[54] PROCESS AND SWITCHING CIRCUIT FOR THE POSITIONAL CONTROL OF RADIAL DRILLING MACHINES

[75] Inventors: István Joó; Lajos Schütz; József Sárosi; Sándor P. Szabó; János Taál; Ottó Szebenyi, all of Budapest, Hungary

[73] Assignee: Csepel Muvek Szerszamgepgyara, Budapest, Hungary

[21] Appl. No.: 416,106

[22] Filed: Sep. 9, 1982

[30] Foreign Application Priority Data

Sep. 14, 1981 [HU] Hungary ............................. 2647/81

[51] Int. Cl.$^4$ ............................................. G05B 19/42
[52] U.S. Cl. ................................... 364/474; 364/171; 364/188; 364/731; 901/17; 408/13
[58] Field of Search .............. 364/167, 171, 474, 513, 364/475, 731, 815; 377/17; 408/8, 13; 901/17

[56] References Cited

U.S. PATENT DOCUMENTS

| | | | |
|---|---|---|---|
| 3,405,257 | 10/1968 | Rantsch et al. | 364/474 X |
| 3,633,011 | 1/1972 | Bederman et al. | 364/300 X |
| 3,920,972 | 11/1975 | Corwin, Jr. et al. | 364/193 X |
| 3,986,007 | 10/1976 | Ruoff, Jr. | 364/300 X |
| 4,002,827 | 1/1977 | Nevin et al. | 364/815 X |
| 4,043,700 | 8/1977 | Singer | 408/3 X |
| 4,106,021 | 8/1978 | Katagi | 364/731 X |
| 4,115,858 | 9/1978 | Kaufman | 364/171 X |
| 4,120,583 | 10/1978 | Hyatt | 364/171 X |
| 4,152,765 | 5/1979 | Weber | 364/171 X |
| 4,162,527 | 6/1979 | Kilbane et al. | 364/171 X |
| 4,228,495 | 10/1980 | Bernhard et al. | 364/474 X |
| 4,271,471 | 6/1981 | Castner | 901/17 X |
| 4,272,818 | 7/1981 | McDaniel | 377/17 X |
| 4,279,013 | 7/1981 | Cameron et al. | 364/474 X |
| 4,364,110 | 12/1982 | Hyatt | 364/171 |
| 4,366,423 | 12/1982 | Inaba et al. | 901/17 X |
| 4,370,720 | 1/1983 | Hyatt | 364/171 X |
| 4,401,930 | 8/1983 | Kato et al. | 364/474 X |
| 4,422,149 | 12/1983 | Reinmold et al. | 377/17 X |
| 4,427,970 | 1/1984 | Devol | 377/17 X |
| 4,434,437 | 2/1984 | Strolle et al. | 364/731 X |

OTHER PUBLICATIONS

M6800 *Microprocessor Application Manual*, Motorola Semiconductor Products, Inc., 1975, pp. 1-8, 1-9, and 3-(8-10).

*Primary Examiner*—Jerry Smith
*Assistant Examiner*—Allen MacDonald
*Attorney, Agent, or Firm*—Handal & Morofsky

[57] ABSTRACT

A process is disclosed for automatically positioning the drill spindle over a workpiece at a predetermined location defining the bore center, wherein the shop drawing and the workpiece bore centers are defined as to their locations in different coordinate systems and wherein the invention provides for calculating and measuring steps to transform between the various coordinate systems. The invention discloses also apparatus for practicing the process by employing a controller-arithmatic unit which carries out the coordination of the plurality of logic circuits and the effecting the use of a programmed performance of the process including the teaching or updating of the program for new bores.

12 Claims, 5 Drawing Figures

PROCESS AND SWITCHING CIRCUIT FOR THE POSITIONAL CONTROL OF RADIAL DRILLING MACHINES

FIELD AND BACKGROUND OF THE INVENTION

The present invention relates to a position control system for a radial drilling machine. The proposed system renders the increase of accuracy, the automation of positioning possible.

The object of the invention is to provide a method for position controlling a drill spindle with respect to bore centers which are determined in a rectangular coordinate system in which the workpiece can be arranged in any position on a base plate.

The difficulties of processing carried out by a radial drilling machine reside in that the drill spindle can be actuated along a circle and a straight line over different workpieces arranged on the base plate. Therefore the position of the drill spindle would be best if determined in polar coordinates. The workpieces, however, are mostly represented on factory drawings in rectangular coordinates showing the orientation of the workpiece and the bores to be prepared in it. Under factory conditions it is difficult to measure the angles with high accuracy and, especially in case of workpieces with sophisticated surface relief, the use of angles on a drawing would result in difficulties. Therefore the known position methods and controls cannot be used.

In case of radial drilling machines two methods have been followed for positioning during preparing the workpieces and the machine boring. The first of them preferred for long series production and includes the application of a bored mask plate. This is placed on the workpiece and the holes in the mask are used for orientation of the drilling spindle. For preparing individual workpieces the second method is preferred according to which guiding marking holes are made in the places where boring should be performed.

The first method is characterized with low accuracy. The second requires a high amount of work.

U.S. Pat. No. 4,043,700 discloses a device for positioning the spindle of a radial drilling machine wherein the spindle is movable in a rectangular coordinate system determined by an appropriate arrangement of frames. The system is clearly mechanical, relatively sophisticated and the frames place limitations on its use.

SUMMARY OF THE INVENTION

The object of the present invention is to provide a position control system for a radial drilling machine based on the recognition that on the basis of mathematical formulae it is possible to create an effective control system.

BRIEF DESCRIPTION OF THE DRAWINGS

The present invention will become more readily apparent from the following description of a preferred embodiment thereof shown, by way of example, in the accompanying drawings, in which.

DESCRIPTION OF THE PREFERRED EMBODIMENT

Figure 1A:
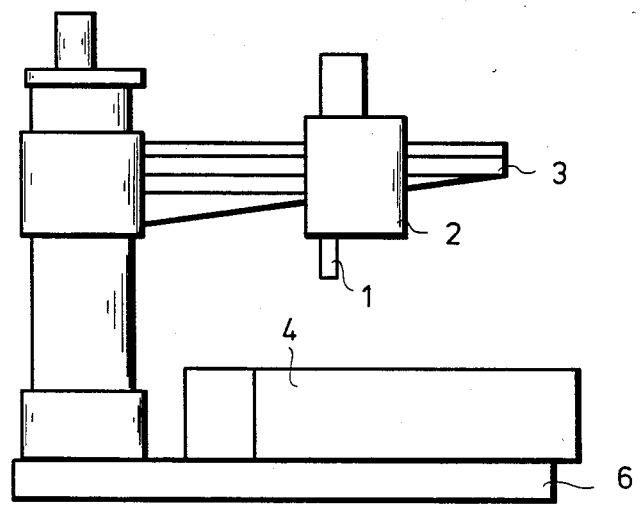
FIG. 1a is a sideview of the radial drilling machine with a workpiece.
Figure 1B:
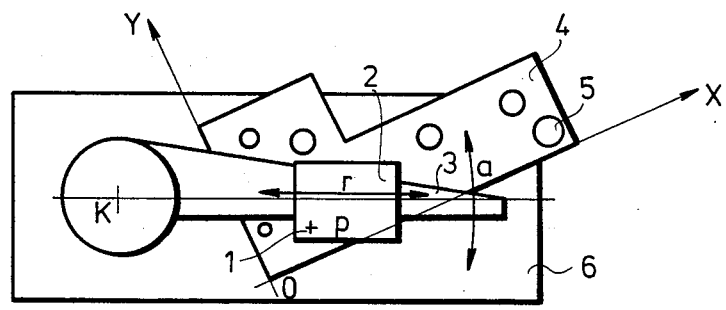
FIG. 1b is a plan view of the radial drilling machine with a workpiece showing the geometric relationships.
Figure 3:
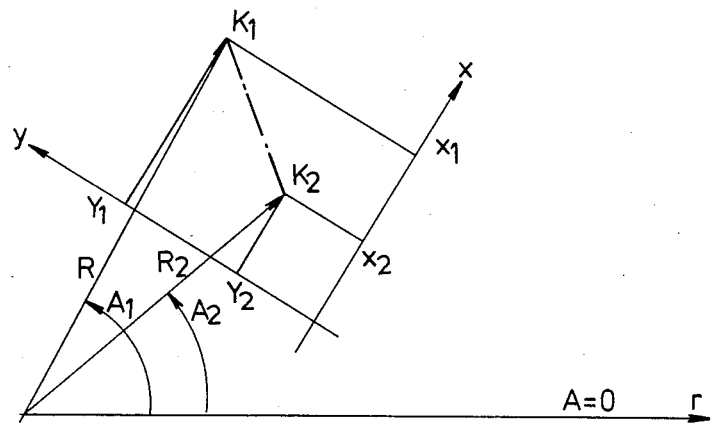
FIG. 3 illustrates the relationship between the polar coordinate system of the radial drilling machine and between the rectangular coordinate system of the workpiece according to the present invention.

On radial drilling machines the location of the spot of processing is performed by the positioning of the drill spindle 1, by moving the drill carriage 2 on the carriage beam 3 as indicated by "r", that is, by rotating "a" of the carriage beam 3 in a coordinate system similar to the polar coordinates (FIG. 1), on the other hand, the location and tolerances of the bore centers 5 of the workpiece 4 are given on the shop drawing in the XY rectangular coordinates. The positioning is performed either by the individual drawing, in advance, of the workpieces or, in the event of larger production series, by the use of special devices. The former is time consuming and inaccurate, while the second approach is extremely expensive. The process and the switching equipment according to the present invention provides a transfer relationship between the coordinate system of the radial drilling machine and the coordinate system of the workpiece by recognizing the relative position of the two coordinate systems. The bore centers and their tolerances of the workpiece being given in the rectangular coordinate system of the shop drawings in the form of a program, the positioning control will transform them into the coordinate system of the radial drilling machine and providing thereby a simple and quick drill positioning. By reversing the transformation, the points noted within the coordinate system of the drilling machine can be transformed into the coordinate system of the workpiece and store them in the form of a program. The process and switching equipment according to the present invention will be described in more detail with reference to FIGS. 1, 2, 3, and 4.

Figure 2:
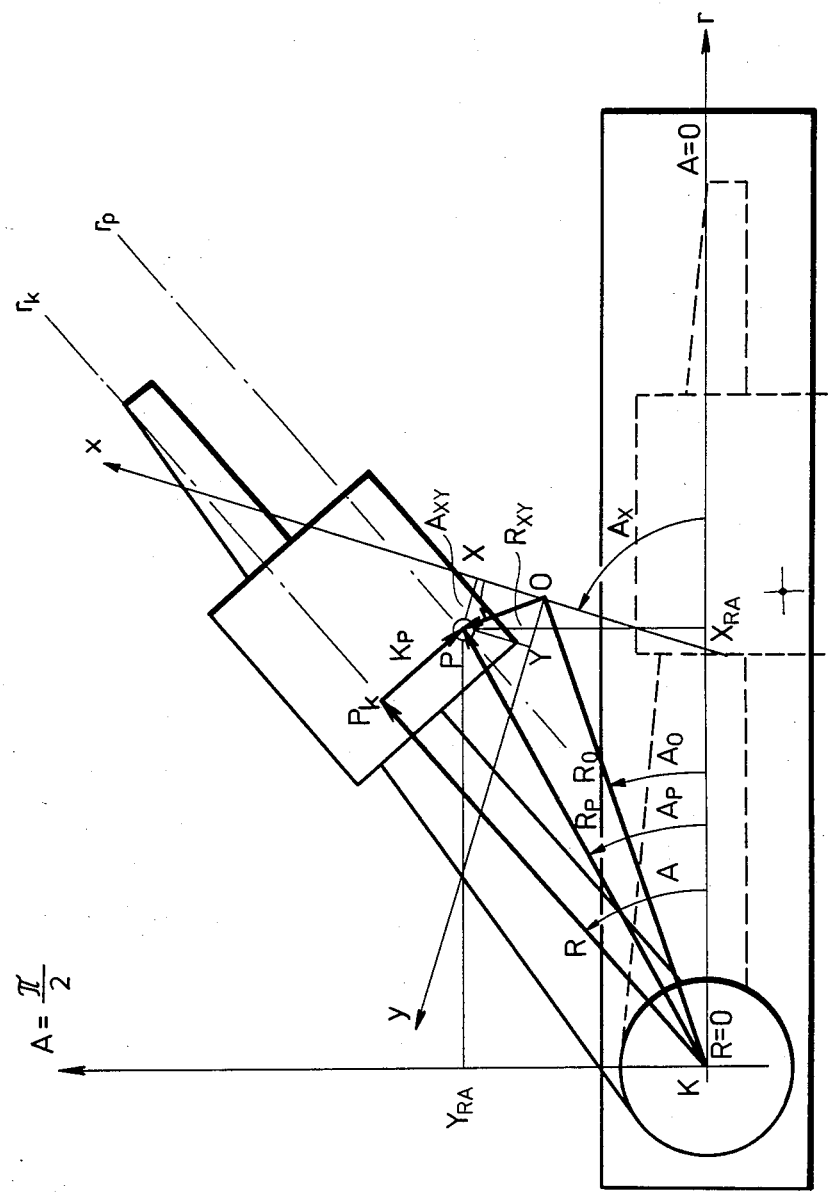
FIG. 2 is a geometric scheme of positioning performed with the radial drilling machine according to the present invention.

The coordinate system of the radial drilling machine and of the workpiece and their interrelationship is illustrated on FIG. 2. The center point P of the drilling spindle during the movement of the drill carriage 2 on the carriage beam 3 will move along a straight line "$r_p$" which is distant by the vertical "$K_p$" from a straight line "$r_{cp10k}$" passing through the center of rotation "K" of the carriage beam 3, while during the rotation of the carriage beam 3, it will move along an arc "a" about the center of rotation "K". On the radial drilling machine, one will directly measure the radical coordinates "R" of the projection "PK" of the center point "P" of the drill spindle as being vertical on the straight line "$r_k$" and the magnitude of the angular coordinate "A", and from this one will calculate the values of the radial coordinates "$R_p$" of the center point "P" of the drilling spindle and of the angular coordinates "$A_p$" according to the following relationships:

$$R_p = \sqrt{R^2 + K_p^2} \tag{1}$$

$$A_p = A - \text{arctg}\frac{K}{R}P \tag{2}$$

wherein the value of "R" is measured from the center of rotation "K", while the value of "A" is measured from the base position of the straight line "$r_k$" of the carriage beam 3 running parallel with the clamping grooves of the base plate 6.

The "O" origin of the rectangular coordinate system of the workpiece 4 is given from the values "$R_o$" and "$A_o$" within the coordinate system of the radial drilling machine, and its location, on the other hand, is given by the angle "$A_x$" of the axis "x". From the knowledge of this the X and Y rectangular coordinates of the center point P of the drill spindle can be calculated within the coordinate system of the workpiece from the polar coordinate values "$R_p$" and "$A_p$" according to the following relationships (3), (4), (5) and (6):

$$R_{xy} = \sqrt{/R_p \cdot \cos A_p - R_o \cdot \cos A_o/^2 + /R_p \cdot \sin A_p - R_o \cdot \sin A_o/^2} \quad (3)$$

$$A_{xy} = \text{arctg} \frac{R_p \cdot \sin A_p - R_o \cdot \sin A_o}{R_p \cdot \cos A_p - R_o \cdot \cos A_o} - A_x \quad (4)$$

$$X = R_{xy} \cdot \cos A_{xy} \quad (5)$$

$$Y = R_{xy} \cdot \sin A_{xy} \quad (6)$$

By reversing the transformation, from the rectangular coordinate values X and Y the polar coordinate values "$R_p$" and "$A_p$" are calculated from the relationship (7), (8), (9) and (10) as follows:

$$X_{RA} = R_o \cdot \cos A_o + \sqrt{X^2 + Y^2} \cdot \cos/A_x + \text{arctg} \frac{Y}{X} / \quad (7)$$

$$Y_{RA} = R_o \cdot \sin A_o + \sqrt{X^2 + Y^2} \cdot \sin/A_x + \text{arctg} \frac{Y}{X} / \quad (8)$$

$$R_p = \sqrt{X_{RA}^2 + Y_{RA}^2} \quad (9)$$

$$A_p = \text{arctg} \frac{Y_{RA}}{X_{RA}} \quad (10)$$

From the values "$R_p$" and "$A_p$" one will calculate the values "R" and "A" according to the relationships (11) and (12):

$$R = \sqrt{R_p^2 - K_p^2} \quad (11)$$

$$A = A_p + \text{arctg} \frac{K_p}{R} \quad (12)$$

The interrelationship of the two coordinate systems are determined by the parameters "$R_o$", "$A_o$" and "$X_o$". They are calculated from the characteristic points of the coordinate system "$K_1$" and "$K_2$" (FIG. 3) when the associated rectangular and polar coordinates of these points are given, that is, taken.

$$A_x = \text{arctg} \frac{R_2 \cdot \sin A_2 - R_1 \cdot \sin A_1}{R_2 \cdot \cos A_2 - R_1 \cdot \cos A_1} - \text{arctg} \frac{Y_2 - Y_1}{X_2 - X_1} \quad (13)$$

$$X_o = R_1 \cdot \cos A_1 - \sqrt{X_1^2 + Y_1^2} \cdot \cos/A_x + \text{arctg} \frac{Y_1}{X_1} / \quad (14)$$

$$Y_o = R_1 \cdot \sin A_1 - \sqrt{X_1^2 + Y_1^2} \cdot \sin/A_x + \text{arctg} \frac{Y_1}{X_1} / \quad (15)$$

$$R_o = \sqrt{X_o^2 + Y_o^2} \quad (16)$$

$$A_o = \text{arctg} \frac{Y_o}{X_o} \quad (17)$$

Inasmuch as the coordination of the values ($R_1$, $A_1$), ($X_1$, $Y_1$) and ($R_2$, $A_2$), ($X_2$, $Y_2$), the coordination becomes redundant, for purposes of checking one will calculate the values ($R_o$, $A_o$) from the related values ($R_2$, $A_2$), ($X_2$, $Y_2$) according to the following relationships (18) and (19):

$$X_o = R_2 \cdot \sin A_2 - \sqrt{X_2^2 + Y_2^2} \cdot \cos/A_x + \text{arctg} \frac{Y_2}{X_2} / \quad (18)$$

$$Y_o = R_2 \cdot \sin A_2 - \sqrt{X_2^2 + Y_2^2} \cdot \sin/A_x + \text{arctg} \frac{Y_2}{X_2} / \quad (19)$$

Figure 4:
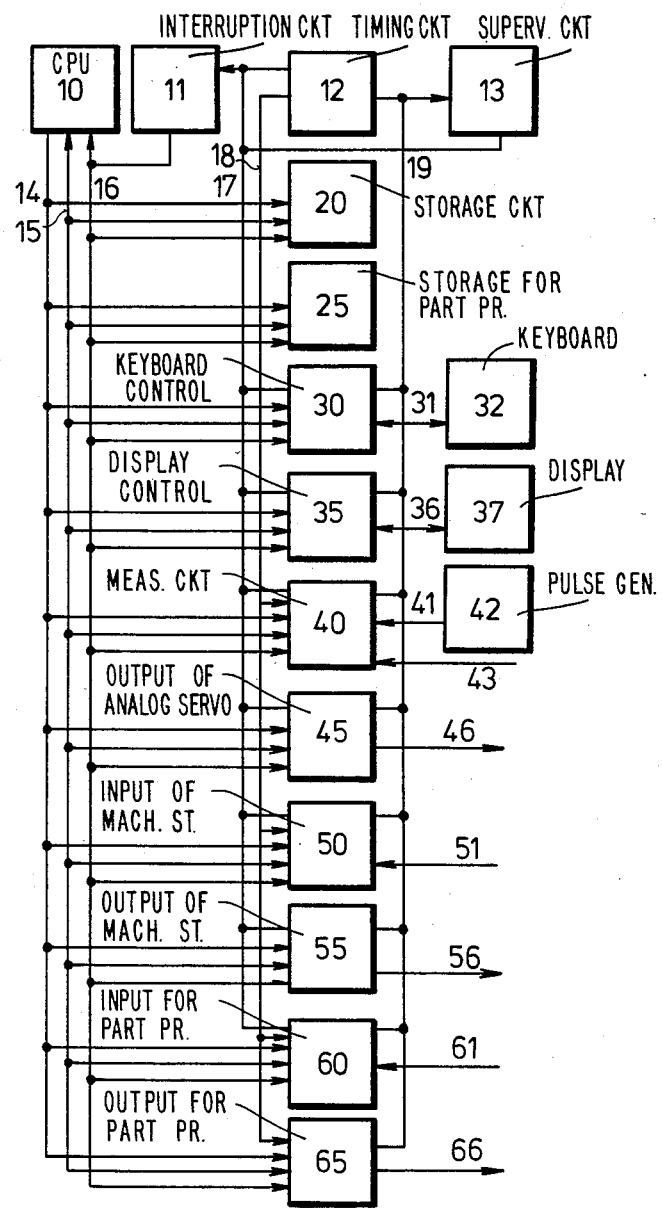
FIG. 4 is a block diagram of the circuits for the control of the drilling machine according to the present invention.

To be noted: the interpretation of the arctg frunctions of the ratios is performed with the consideration of the signs of the numerators and denominators. The switching equipment according to the present invention is illustrated in FIG. 4 and with the help of that the functions will be also described.

The controller and arithmetic circuit 10 (Motorola MC6800) will perform in accordance with the contents of the control and arithmetic program storage circuit 20 (Texas TMS2516, Texas TMS4047) and in accordance with the contents of the part program storage circuit 25 (Texas TMS2516, Texas TMS4047) the control of the operation and their coordination of the individual functional units with the help of the address signals 14, data signals 15, and control signals 16, in such manner that the control of the radial drilling machine should proceed according to the contents of the processing program and, also performs the arithmetic calculations associated with the above-described coordinate transformations.

The interruption affecting circuit 11 (Motorola MC6828) on the basis of the interruption requesting signals 17 will evaluate the request coming from the checking and supervisory circuit 13, the (Motorola MC6820) measuring circuit 40 (Motorola MC74193) the machine status input circuit 50 (Motorola MC6820), the timing circuit 12 (Motorola MC6820), the part program input circuit 60 (Motorola MC6850) and of the keyboard controller circuit 30 (Intel I8279) and will assign to them properties decreasing in order of sequence and transfers them to the (controller and arithmmetic circuit) 10 which is actuated by them.

The timing circuit 12 with the help of the timing signals 18 will timely coordinate the operation of the individual circuits, that is, in given times with the signals requesting interruption 17 through the interruption circuit 11 will signal the controller and arithmetic circuit 10. The checking and supervising circuit 13 with the help of the control signals 19 will perform the supervision of the operational capability of the individual blocks or circuits and in the event of a defective operation it will signal with an interruption requesting signal 17 through the circuit 11 evaluating the interruption requesting signal, will deliver signals to the controller and arithmetic circuit 10.

The control and arithmetic storage circuit 20 which contains the control program will contain also those algorithms and data with the help of which the controller and arithmetic circuit 10 will control and perform the transformation data, the checking of the operation of the individual units, their interconnection and their connection with the controlled radial drilling machine as well as the connection with the operating personnel and with the peripheral equipment. Its structure contains preferably storage elements which retain the information.

The contents of the circuit 25 storing the part program will define a data to be performed with the radial drilling machine (values of the bore centers and tolerances, feed and number of revolutions) and their functions (loosening, fixing, cooling water, changing of the number of the revolutions, die change etc.). Its layout should be preferably read and write type, and contain storage elements which retain their contents for a long time at a minimum energy consumption.

The keyboard controller circuit 30 with the help of the keyboard controller signals 31 from the keyboard 32 will make it possible that the part program can be put in manually and modified and also permits the manual intervention of the operating personnel.

The display controller circuit 35 (Intel I8279) with the help of display controller signals 36 will make it possible at the display 37 to inform the operating personnel about the part program, the actual position and status of the radial drilling machine and general information.

The measuring circuit 40 on the basis of the pulse generators 42 registering the deflections of the radial drilling machine with the help of pulse generator signals 41 as well as with the help of the machine reference points signals 43 will determine the deflections, about their increases between two interrogations and, on the basis of such data the controller and arithmetic circuit 10 will calculate the actual values "$R_p$" and "$A_p$" of the bore center "P" of the drill spindle. The credibility of the calculated actual position values is always checked when passing over the reference points and in the event deviations, error will be signaled, and by this the production of a waste or defective workpiece is eliminated which would result from the defects or errors of the measuring system. The measuring circuit 40 is capable in addition to calculating the A and R coordinates of the radial drilling machine, also to measure the further deflections, such as, a vertical movement of the carriage beam and drill spindle if they are also provided with pulse generators and reference position contacts.

The analog servo output 45 circuit (Analog Devices AD563) with the help of the analog servo-output signals 46 will regulate the servo drives controlling and regulating the deflections and, if needed, also the main drive driving the drill spindle in a controllable manner.

The input circuit 50 about the state of the machine will process the input signals of the machine status 51 and representing the position contacts of the radial drilling machine, its pressure switches, sensors, push buttons, switches etc. and will transfer them to the controller and arithmetic circuit 10 which will consider them during the processing of the operating program and the control of the radial drilling machine.

The output circuit 55 (Motorola MC6820) controlling the status of the machine on the basis of the commands coming from the controller and arithmetic circuit 10 will perform the control with the help of output signals 56 controlling the machine status, the various machine functions of the radial drilling machine (for example, loosening, fixing, cooling liquid, tool change, feed of the drill spindle or change of its magnitude, etc.) and also drives the indicating lights of the operating console.

The input circuit 60 for the part program with the help of the input signals 61 for the part program coming from some information carriers (cassette tape, punch tape reader, etc.) with the help of the controller and arithmetic circuit 10 will deliver the part program to the storage circuit 25 of the part program. While putting in the data will be continuously checked for credibility.

The output circuit 65 (Motorola MC6850) of the part program under the controller of the control and arithmetic circuit 10 will deliver the part programs stored in the circuit 25 for the part program with the help of the output signals 66 for the part program to a program recording peripheral equipment (cassette tape, tape punching unit etc.), that is, will prepare a list of the part program with the help of a printer-type peripheral equipment.

The structuring of the positioning control preferably can be put in three steps. All variations will contain, although in different form, the controller and arithmetic circuit 10, the control and arithmetic program storing circuit 20, the part program containing circuit 25, the measuring circuit 40, the input circuit 50 of the machine status and the output circuit (55) controlling the machine status. The most simplified embodiment is adapted for receiving a program and for its returning, with the help of very few keys and indicating lights. An embodiment having an average structure, to the keyboard controller circuit 30 a part program can be fed from the keyboard 32 manually and the part program and the various states of the processing can be signalized through the display controller circuit 35 with the help of display 37, and further it is possible to put in the program through the part program input circuit 60 from a cassette tape or other information carrier, as well as the printing of the program by a printer. The most simple and the average structured embodiments can be mounted on conventional and existing radial drilling machines without making major changes on the machine and the positioning will be performed manually. In the case of a fully developed embodiment, by the output circuit 45 of the analog servo the positioning can be regulated with servo drives and the operation of the radial drilling machine becomes automatized to a great extent (loosening, fixing, feed and main spindle to any degree, tool change, cooling water, etc.) which, however, will require the presence of a radial drilling machine which is specially constructed for such purpose.

The basic function of the position control mounted on a radial drilling machine resides in that the position of the center point "P" of the drill spindle 1 should be measured and compared with the position of the bore centers 5 given in the part program by employing the dual transformation between the rectangular coordinate system of the workpiece and the polar coordinate system of the radial drilling machine.

At the learning of the program the bore coordinates X and Y are calculated from the coordinates R and A using the relationships (1), (2), (3), (4), (5) and (6) while during the delivery of the program the eventual R and A coordinates are calculated from the program X and Y values on the basis of the relationships (7), (8), (9), (10), (11) and (12). The relative position of the two coordinate systems are determined by the parameters "$R_o$", "$A_o$" and "$A_x$", which are calculated by the control after the establishing of the marking points of the coordinate system $K_1$ and $K_2$ or after such points were given and their associated values $R_1$, $A_1$ and $X_1$, $Y_1$, e.g. $R_2$, $A_2$ and $X_2$, $Y_2$ using the relationships (13), (14), (15), (16) and (17) and will check the correctness of the given values by using the relationships (18) and (19).

The part program which contains the bore centers and their tolerances (in a more complex structuring the depth of the bore, the magnitude of the feed and spindle revolution), in the sequence of processing and in the coordinate system of the workpiece and receives it by being fed to it from a machine, that is, from an outside program carrier. The problem itself is independent of the coordinate system of the radial drilling machine, and as a result, the workpiece 4 can be mounted in any desired position on base plate 6. The change of individual points or instructions in the program or addition of instructions or erasure of instructions or the complete erasure of programs is also possible.

The storage of program is performed always with the help of control data or indices so that a defective program can be recognized or corrected.

We claim:

1. Position control system for a radial drilling tool machine with a drill spindle having a centerpoint P, a carriage beam having a center of rotation K, said system comprising:

(a) means for storing a control and arithmetic program to be performed, said control and arithmetic program including programmed mathematic formulae for determining a desired position of the center point P of a drilling spindle in relation to predetermined base points of a workpiece in a rectangular coordinate system employing the following relationships:

$$R_p = \sqrt{R^2 + K_p^2} \quad (1)$$

$$A_p = A - \text{arctg} \frac{K}{R} P \quad (2)$$

$$R_{xy} = \sqrt{/R_p \cdot \cos A_p - R_o \cdot \cos A_o/^2 + /R_p \cdot \sin A_p - R_o \cdot \sin A_o/^2} \quad (3)$$

$$A_{xy} = \text{arctg} \frac{R_p \cdot \sin A_p - R_o \cdot \sin A_o}{R_p \cdot \cos A_p - R_o \cdot \cos A_o} - A_x \quad (4)$$

$$X = R_{xy} \cdot \cos A_{xy} \quad (5)$$

$$Y = R_{xy} \cdot \sin A_{xy} \quad (6)$$

wherein: the value of R is measured from the center of rotation K of the carriage beam; a magnitude of an angular coordinate A is measured from a base position of a straight line $r_k$ of the carriage beam;
   $r_p$ = a straight path swept by the center point of the drill spindle during the movement of the drill carriage on the carriage beam;
   $r_k$ = a straight line parallel with the straight line $r_p$ and passing through the point of rotation of the carriage beam;
   $K_p$ = a distance between the parallel straight lines $r_k$ and $r_p$;
   $R_p$ = a radial coordinate value of the centerpoint of the drill spindle;
   $A_p$ = an angular coordinate value of the centerpoint of the drill spindle;
   $R_o$ = a radial coordinate value of the origin;
   $A_o$ = an angular coordinate value of the origin;
   $R_{xy}$ = a length of the vector pointing from the origin to the centerpoint of the drill spindle;
   $A_{xy}$ = an angle of the vector pointing from the origin to the centerpoint of the drill spindle with respect to the X axis;
   X = an x coordinate value of the centerpoint of the drill spindle;
   Y = a y coordinate value of the centerpoint of the drill spindle;
   said drilling spindle being actuated in a radial coordinate system given by an axle of rotation of a carriage beam and a base straight line crossing said axle of rotation, said carriage beam having a straight line guiding path for said drilling spindle parallel to a straight line crossing the axle of rotation, (b) means for storing a processing program to be performed in order to actuate said drilling spindle for preparing bores in predetermined points of the workpiece, (c) means for measuring a relative position of said drilling spindle to said base straight line and said axle of rotation and generating measurement signals corresponding to the actual position of said drilling spindle, (d) means for testing a plurality of switching, controlling and regulating elements of the radial drilling tool machine, said testing means generating status signals, and (e) means for controlling said plurality of switching, controlling and regulating means, said controlling means generating actuating signal wherein, said control and arithmetic program storing means, said processing program storing means, said relative position measuring means and said testing means are coupled by address lines, data lines and control lines with means for processing said programs, measurement and status signals, determining the relative position of said drilling spindle and generating control signals for said controlling means.

2. The system as set forth in claim 1, further comprising means for handling interruption commands, said handling means coupled via interruption requesting input lines with said measuring means and testing means, and the output of said handling means is coupled with said processing unit.

3. The system as set forth in claim 2, further comprising a timing circuit for time coordination of the operation of said measuring means, of said testing means, and of said interruption handling means, said timing circuit being coupled via said interruption requesting input lines with said handling means and via timing lines with said measuring means and testing means.

4. The system as set forth in claim 2, further comprising means connected to for checking and supervising said measuring means, testing means and controlling means, said checking means being coupled via said interruption handling input lines with said handling means.

5. Position control system for a radial drilling tool machine with a drill spindle having a centerpoint P, a carriage beam having a center of rotation K, said system comprising:

(a) means for storing a control and arithmetic program to be performed, said control and arithmetic program including programmed mathematic formulae for determining a desired position of a drilling spindle in relation to predetermined base points of a workpiece in a retangular coordinate system employing the following relationships:

$$R_p = \sqrt{R^2 + K_p^2} \qquad (1)$$

$$A_p = A - \operatorname{arctg} \frac{K}{R} P \qquad (2)$$

$$R_{xy} = \sqrt{/R_p \cdot \cos A_p - R_o \cdot \cos A_o/^2 + /R_p \cdot \sin A_p - R_o \cdot \sin A_o/^2} \qquad (3)$$

$$A_{xy} = \operatorname{arctg} \frac{R_p \cdot \sin A_p - R_o \cdot \sin A_o}{R_p \cdot \cos A_p - R_o \cdot \cos A_o} - A_x \qquad (4)$$

$$X = R_{xy} \cdot \cos A_{xy} \qquad (5)$$

$$Y = R_{xy} \cdot \sin A_{xy} \qquad (6)$$

wherein: the value of R is measured from the center of rotation K of the carriage beam; a magnitude of an angular coordinate A is measured from a base position of a straight line $r_k$ of the carriage beam;

$r_p$ = a straight path swept by the center point of the drill spindle during the movement of the drill carriage on the carriage beam;

$r_k$ = a straight line parallel with the straight line $r_p$ and passing through the point of rotation of the carriage beam;

$K_p$ = a distance between the parallel straight lines $r_k$ and $r_p$;

$R_p$ = a radial coordinate value of the centerpoint of the drill spindle;

$A_p$ = an angular coordinate value of the centerpoint of the drill spindle;

$R_o$ = a radial coordinate value of the origin;

$A_o$ = an angular coordinate value of the origin;

$R_{xy}$ = a length of the vector pointing from the origin to the centerpoint of the drill spindle;

$A_{xy}$ = an angle of the vector pointing from the origin to the centerpoint of the drill spindle with respect to the X axis;

X = an x coordinate value of the centerpoint of the drill spindle;

Y = a y coordinate value of the centerpoint of the drill spindle;

said drilling spindle being actuated in a radial coordinate system given by an axle of rotation of a carriage beam and a base straight line crossing said axle of rotation, said carriage beam having a straight line guiding path for said drilling spindle parallel to a straight line crossing the axle of rotation, (b) means for storing a processing program to be performed in order to actuate said drilling spindle for preparing bores in predetermined points of the workpiece, (c) means for measuring a relative position of said drilling spindle to said base straight line and said axle of rotation and generating measurement signals corresponding to the actual position of said drilling spindle, (d) means for testing a plurality of switching, controlling and regulating elements of the radial drilling tool machine, said testing means generating status signals, (e) means for controlling said plurality of switching, controlling and regulating means, said controlling means generating actuating signals, (f) means for processing said programs, measurement and status signals for determining the relative position of said drilling spindle and generating control signals for said controlling means, (g) a keyboard controller unit connected with a keyboard for sending input data and commands to said storing, measuring, controlling and processing means, (h) a display controller unit connected to all of the aforesaid means for displaying a plurality of different data concerning the radial drilling tool machine and the position control system, and (i) an input circuit for receiving input signals for the processing program and (j) an output circuit for forwarding output signals for the processing program, and both being connected to said means for storing the processing program, wherein said (a) control and arithmetic program storing means; (b) processing program storing means; (c) relative position measuring means; (d) testing means; (e) controlling means; (f) processing means; (g) keyboard controller unit; (h) display controller unit; (i) input circuit; (j) output circuit; are coupled via address lines, data lines and control lines with said processing means.

6. The system as set forth in claim 5, further comprising means for handling interruption commands, said handling means coupled via interruption requesting input lines with said keyboard controller unit, display controller unit, measuring means, testing means, input circuit and output circuit, and the output of said handling means is coupled with said processing unit.

7. The system as set forth in claim 5, further comprising a timing circuit for time coordination of the operation of said measuring means, of said testing means and of said interruption handling means, said timing circuit being coupled via said interruption requesting input lines with said handling means and via timing lines with said measuring means, testing means, and input circuit.

8. The system as set forth in claim 5, further comprising means connected to for checking and supervising said keyboard controller unit, display controller unit, measuring means, testing means, controlling means, input circuit and output circuit, said checking means being coupled via said interruption handling input lines with said handling means.

9. Position control system for a radial drilling tool machine with a drill spindle having a centerpoint P, a carriage beam having a center of rotation K, said system comprising:

(a) means for storing a control and arithmetic program to be performed, said control and arithmetic program including programmed mathematic formulae for determining a desired position of a drilling spindle in relation to predetermined base points of a workpiece in a rectangular coordinate system employing the relationships:

$$R_p = \sqrt{R^2 + K_p^2} \qquad (1)$$

$$A_p = A - \operatorname{arctg} \frac{K}{R} P \qquad (2)$$

-continued $$R_{xy} = \sqrt{/R_p \cdot \cos A_p - R_o \cdot \cos A_o/^2 + /R_p \cdot \sin A_p - R_o \cdot \sin A_o/^2} \quad (3)$$

$$A_{xy} = \text{arctg} \frac{R_p \cdot \sin A_p - R_o \cdot \sin A_o}{R_p \cdot \cos A_p - R_o \cdot \cos A_o} - A_x \quad (4)$$

$$X = R_{xy} \cdot \cos A_{xy} \quad (5)$$

$$Y = R_{xy} \cdot \sin A_{xy} \quad (6)$$

wherein: the value of R is measured from the center of rotation K of the carriage beam: a magnitude of an angular coordinate A is measured from a base position of the straight line $r_k$ of the carriage beam;

$r_p$ = a straight path swept by the center point of the drill spindle during the movement of the drill carriage on the carriage beam;

$r_k$ = a straight line parallel with the straight line $r_p$ and passing through the point of rotation of the carriage beam;

$K_p$ = a distance between the parallel straight lines $r_k$ and $r_p$;

$R_p$ = a radial coordinate value of the centerpoint of the drill spindle;

$A_p$ = an angular coordinate value of the centerpoint of the drill spindle;

$R_o$ = a radial coordinate value of the origin;

$A_o$ = an angular coordinate value of the origin;

$R_{xy}$ = a length of the vector pointing from the origin to the centerpoint of the drill spindle;

$A_{xy}$ = an angle of the vector pointing from the origin to the centerpoint of the drill spindle with respect to the X axis;

X = an x coordinate value of the centerpoint of the drill spindle;

Y = an y coordinate value of the centerpoint of the drill spindle;

said drilling spindle being actuated in a radial coordinate system given by an axle of rotation of a carriage beam and a base straight line crossing said axle of rotation, said carriage beam having a straight line guiding path for said drilling spindle parallel to a straight line crossing the axle of rotation, (b) means for storing a processing program to be performed in order to actuate said drilling spindle for preparing bores in predetermined points of the workpiece, (c) means for measuring a relative position of said drilling spindle to said base straight line and said axle of rotation and generating measurement signals corresponding to the actual position of said drilling spindle, (d) means for testing a plurality of switching, controlling and regulating elements of the radial drilling tool machine, said testing means generating status signals, and (e) means for controlling said plurality of switching, controlling and regulating means, said controlling means generating actuating signals, (f) means for processing said programs, measurement and status signals for determining the relative position of said drilling spindle and generating control signals for said controlling means, (g) a keyboard controller unit connected with a keyboard for sending input data and commands to said storing, measuring, controlling and processing means, (h) a display controller unit connected to all of the aforesaid means for displaying a plurality of different data concerning the radial drilling tool machine and the position control system, (i) an input circuit for receiving input signals for the processing program and (j) an output circuit for forwarding output signals for the processing program, and both being connected to said means for storing the processing program, (k) an analog circuit for generating control signals to servomechanism actuating drives of said drilling spindle, carriage beam and elements guiding said drilling spindle along said straight line coupled via said address lines, data lines and control lines with said processing means, and (l) means for receiving signals from reference point detectors arranged on the radial drilling tool machine and forwarding them to said measuring means wherein said (a) control and arithmetic program storing means; (b) processing program storing means; (c) relative position measuring means; (d) testing means; (e) controlling means; (f) processing means; (g) keyboard controller unit; (h) display controller unit; (i) input circuit; (j) output circuit, and (k) analog circuit; are coupled via said address lines, data lines and control lines with said processing means.

10. The system as set forth in claim 9, further comprising means for handling interruption commands, said handling means coupled via interruption requesting input lines with said keyboard controller unit, display controller unit, measuring means, testing means, input circuit and output circuit, and the output of said handling means is coupled with said processing unit.

11. The system as set forth in claim 9, further comprising a timing circuit for time coordination of the operation of said (a) control and arithmetic program storing means; (b) processing program storing means; (c) relative position measuring means; (d) testing means; (e) controlling means; (f) processing means; (g) keyboard controller unit; (h) display controller unit; (i) input circuit; (j) output circuit; and (k) analog circuit of the radial drilling machine, said timing circuit being coupled via said interruption requesting input lines with said handling means and via timing lines with said measuring means, testing means, and input circuit.

12. The system as set forth in claim 9, further comprising means connected to for checking and supervising said keyboard controller unit, display controller unit, measuring means, analogous circuit, testing means, controlling means, input circuit and output circuit, said checking means being coupled via said interruption handling input lines with said handling means.

* * * * *